May 2, 1950          C. E. MILLER          2,506,515
AUTOMATIC LATHE OR SCREW MACHINE
Filed May 6, 1944          9 Sheets-Sheet 1
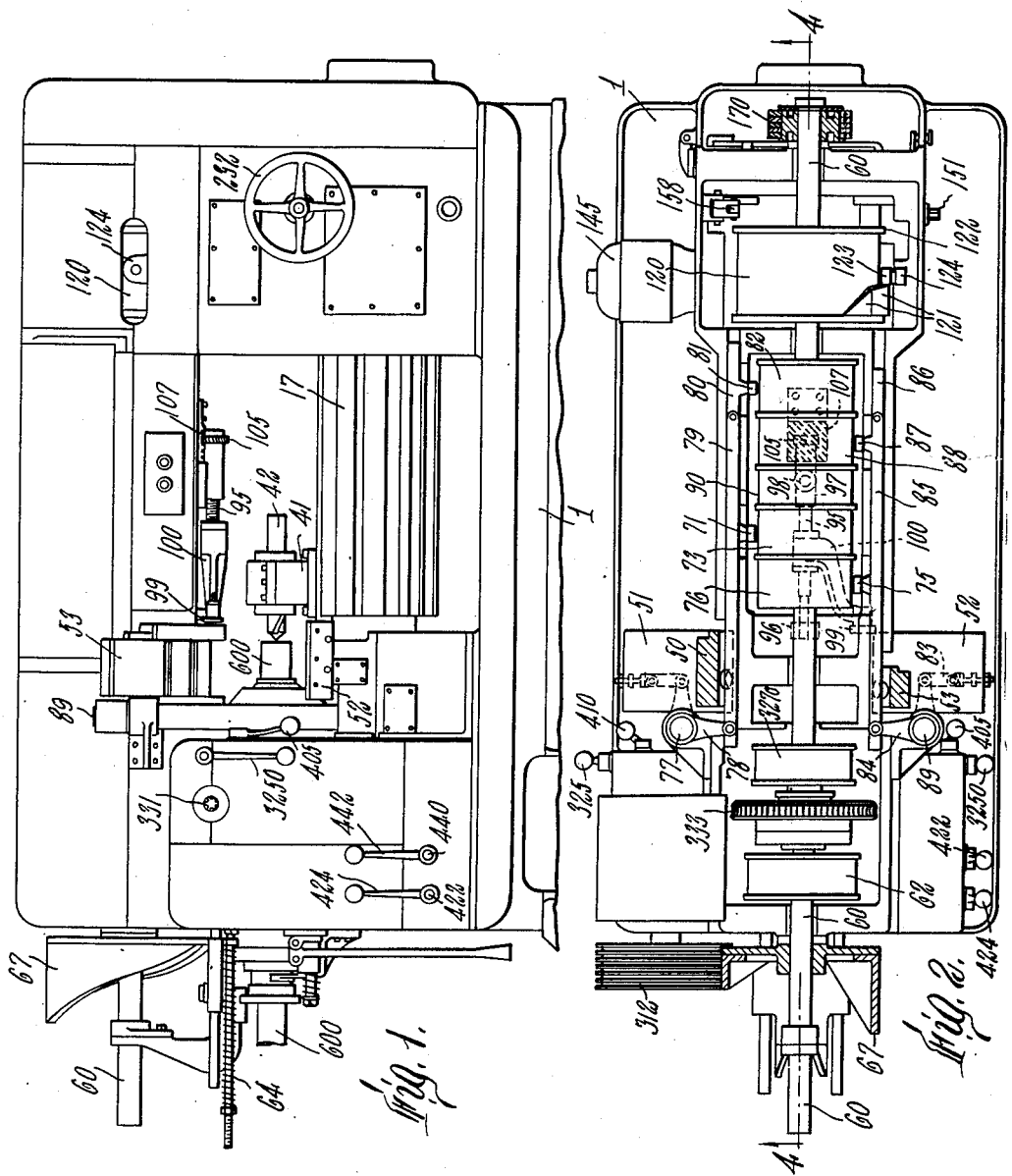

May 2, 1950           C. E. MILLER           2,506,515
AUTOMATIC LATHE OR SCREW MACHINE
Filed May 6, 1944           9 Sheets-Sheet 2
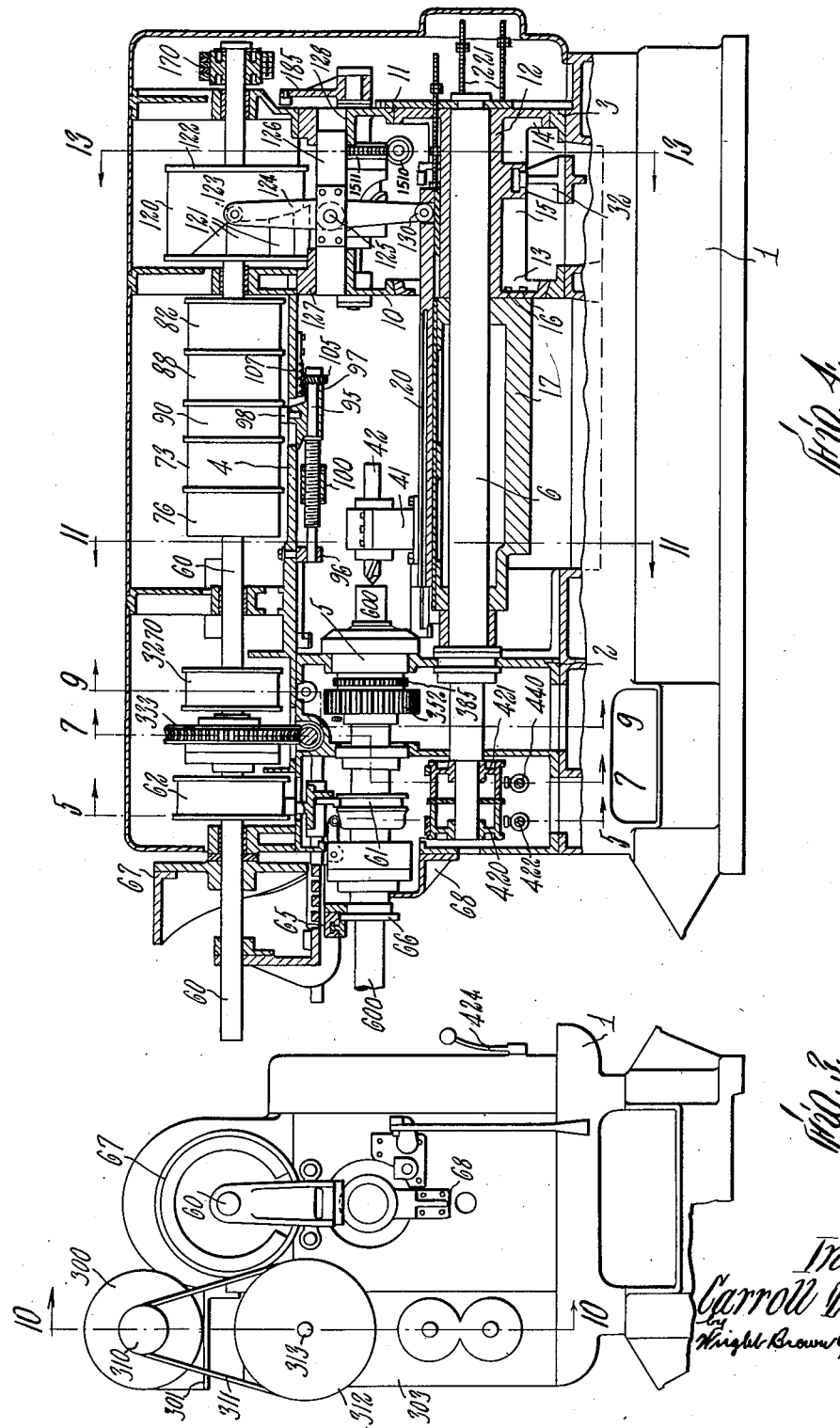

May 2, 1950 C. E. MILLER 2,506,515
AUTOMATIC LATHE OR SCREW MACHINE
Filed May 6, 1944 9 Sheets-Sheet 3
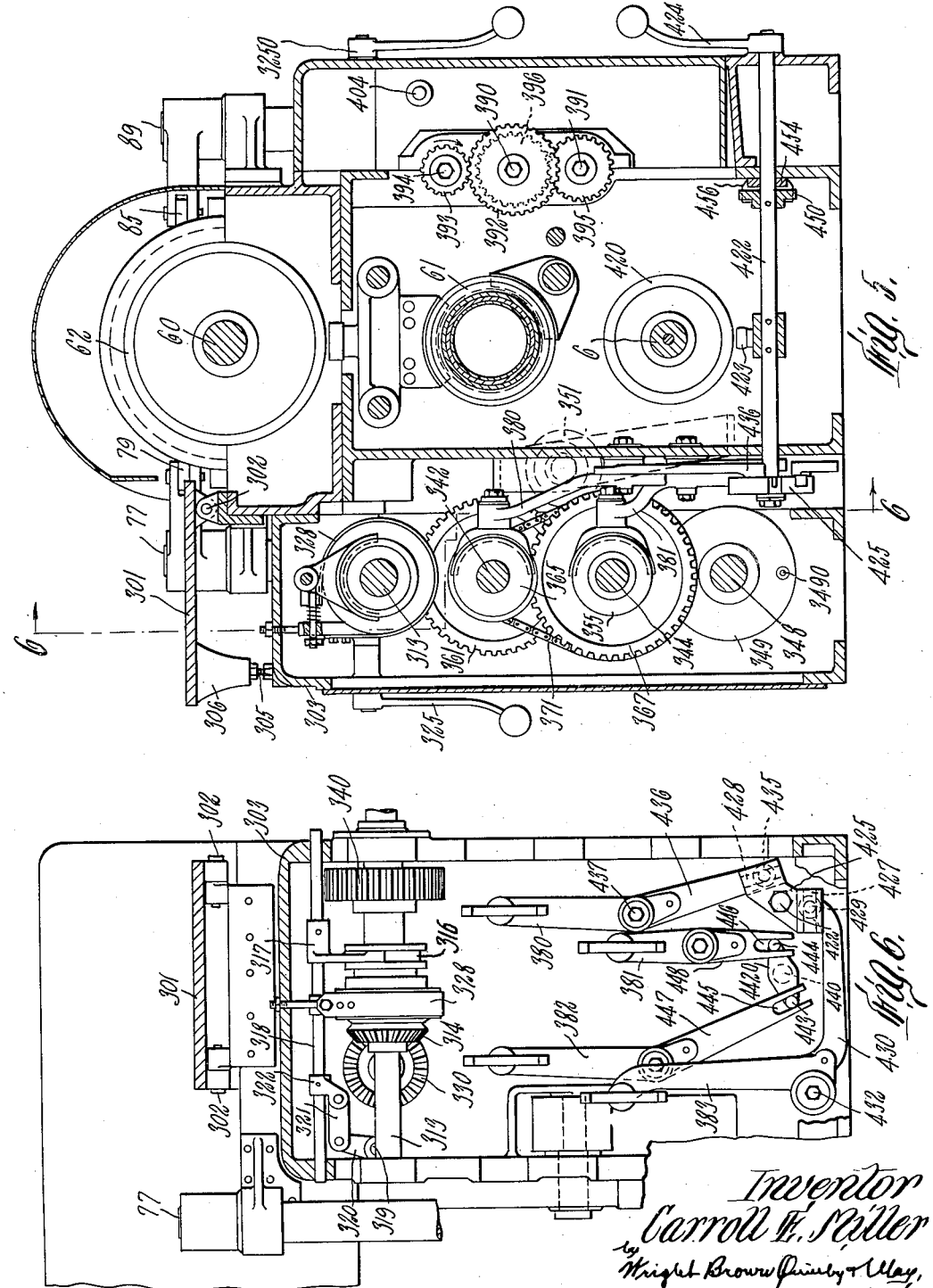
Inventor
Carroll E. Miller
by Wright Brown Quinby & May
Attys.

May 2, 1950          C. E. MILLER          2,506,515
AUTOMATIC LATHE OR SCREW MACHINE
Filed May 6, 1944          9 Sheets-Sheet 4
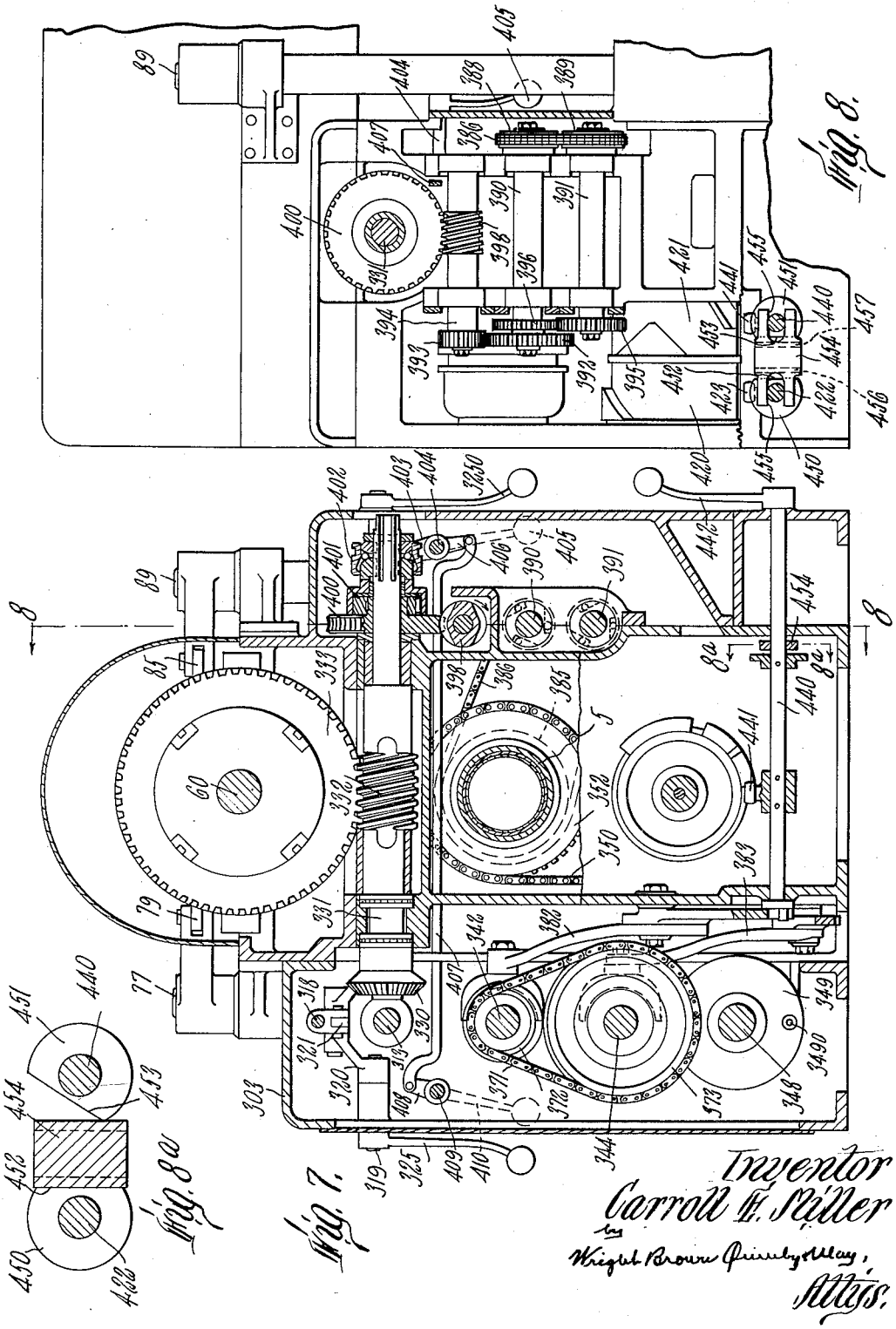

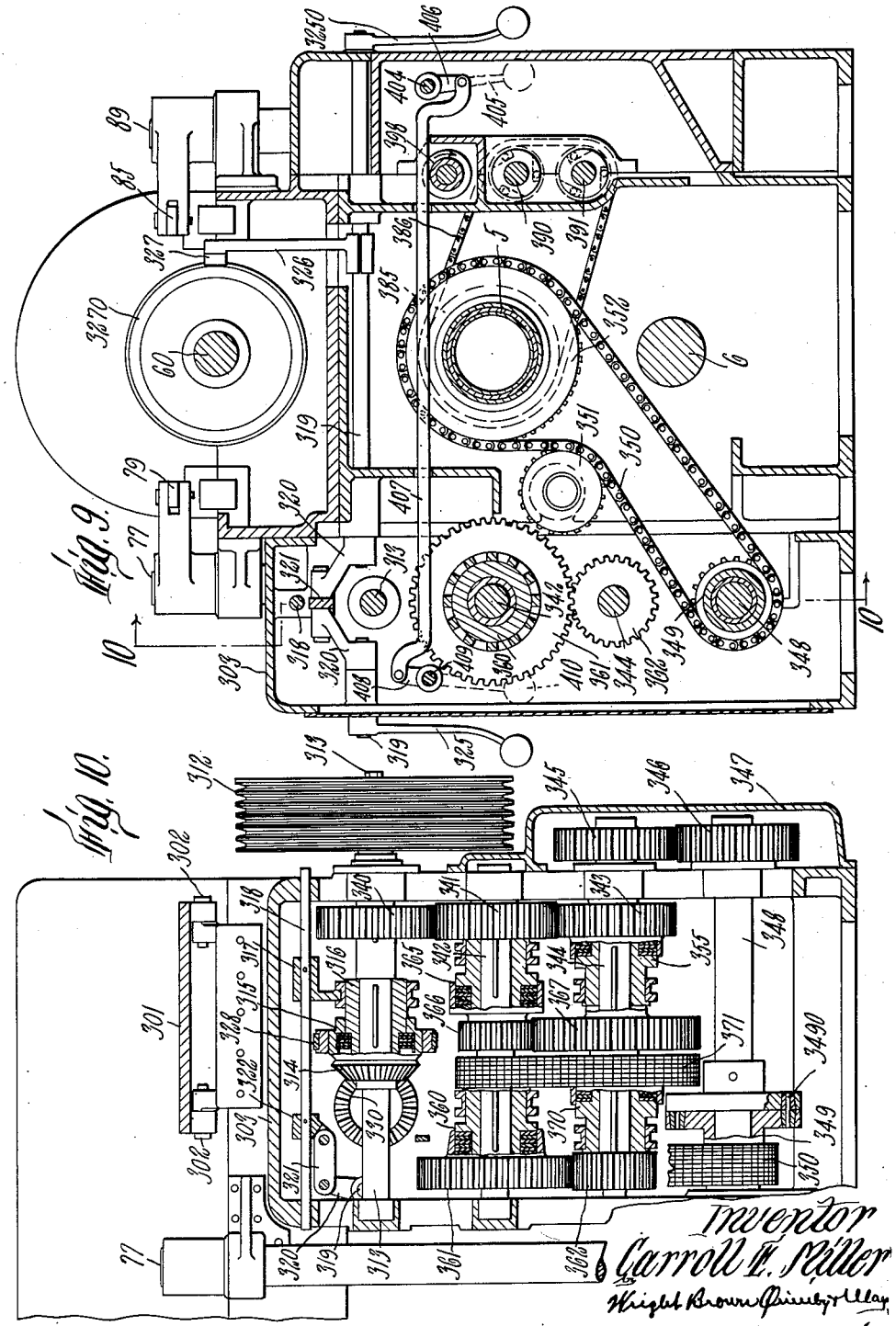

May 2, 1950      C. E. MILLER      2,506,515
AUTOMATIC LATHE OR SCREW MACHINE
Filed May 6, 1944      9 Sheets-Sheet 6
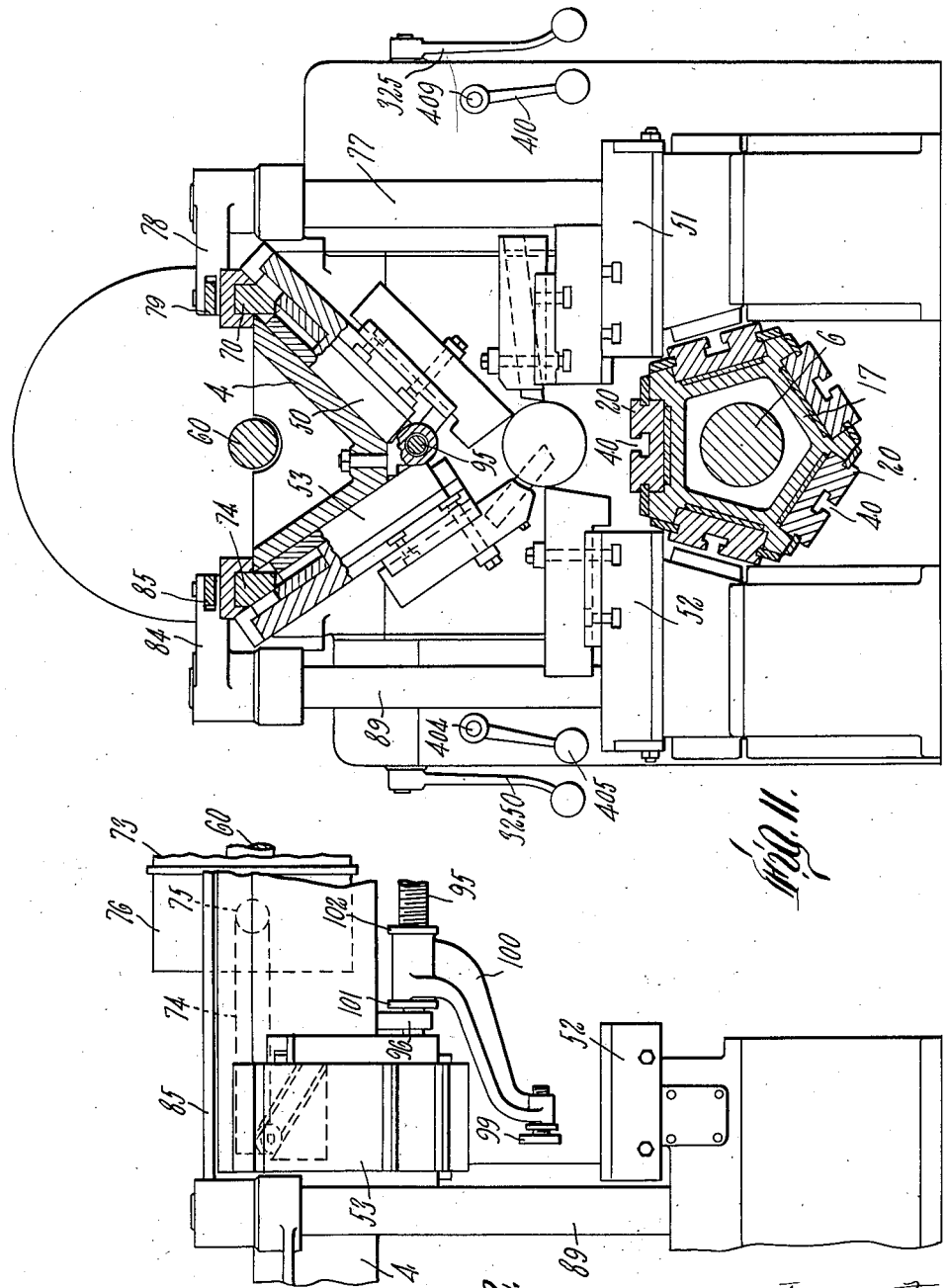

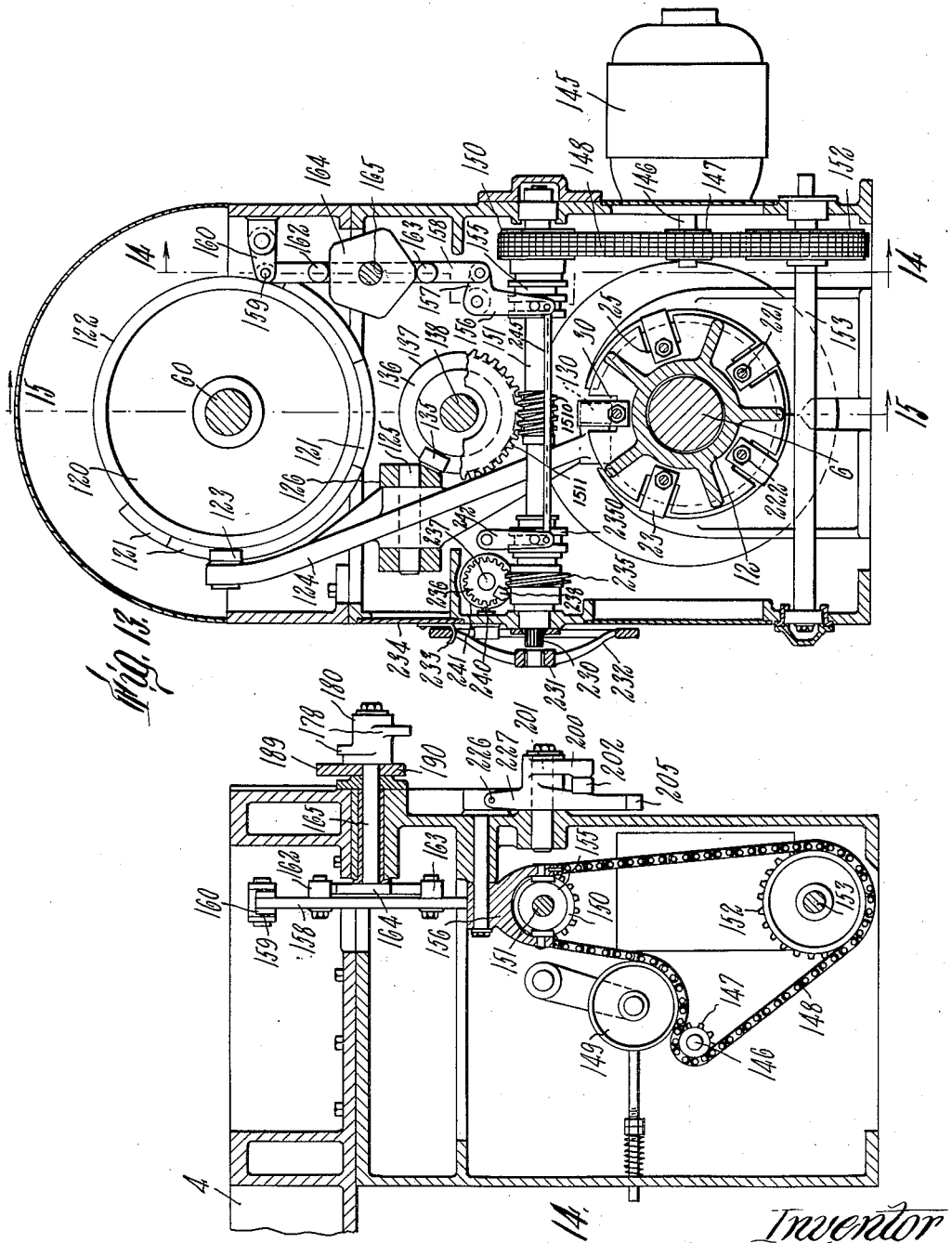

May 2, 1950   C. E. MILLER   2,506,515
AUTOMATIC LATHE OR SCREW MACHINE
Filed May 6, 1944   9 Sheets-Sheet 8
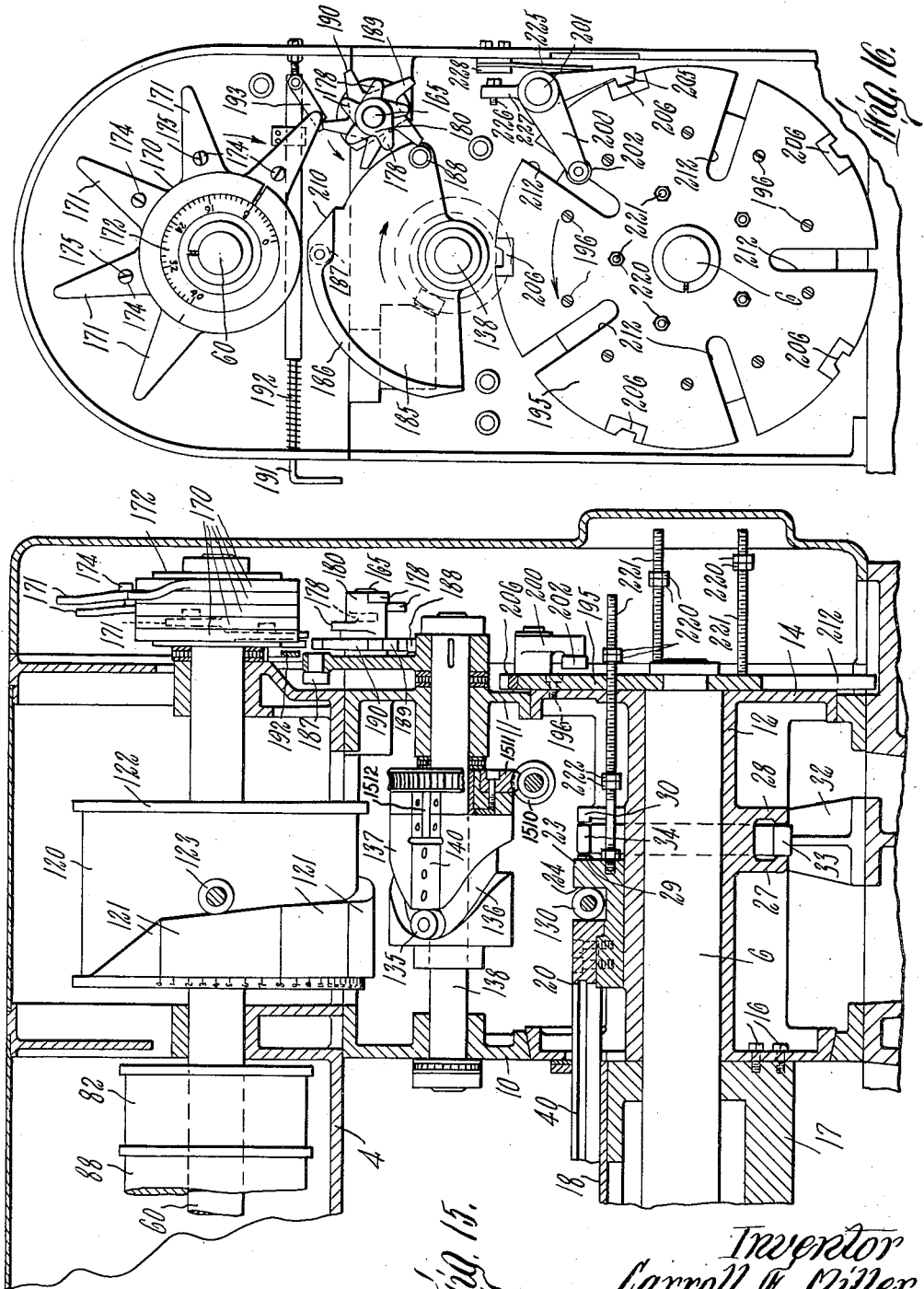
Inventor
Carroll E. Miller
by Wright Brown Quinby & May
Attys.

May 2, 1950  C. E. MILLER  2,506,515
AUTOMATIC LATHE OR SCREW MACHINE
Filed May 6, 1944  9 Sheets-Sheet 9
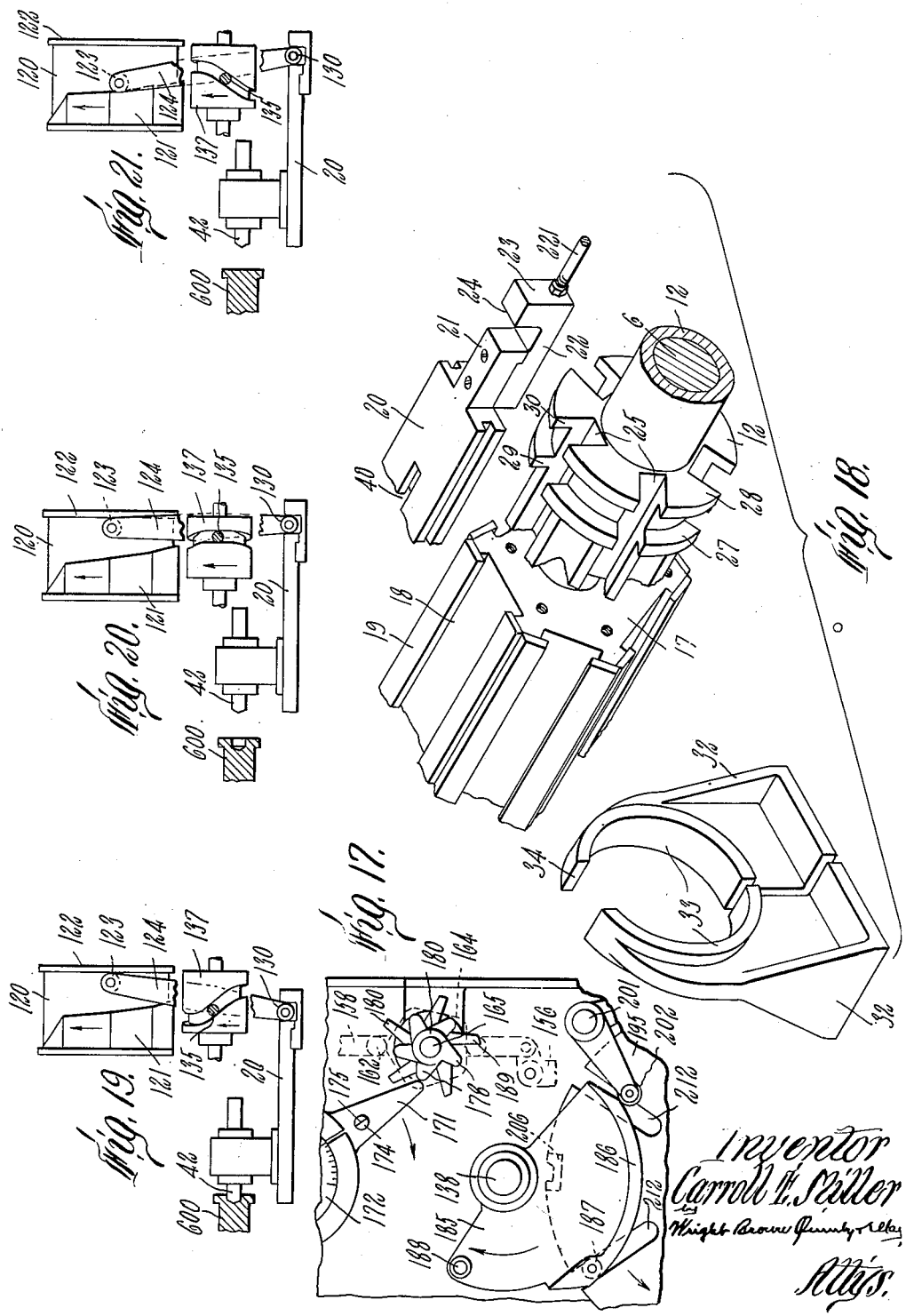

Patented May 2, 1950

2,506,515

UNITED STATES PATENT OFFICE 2,506,515

AUTOMATIC LATHE OR SCREW MACHINE

Carroll E. Miller, Windsor, Vt., assignor to Cone Automatic Machine Company Inc., Windsor, Vt., a corporation of Vermont Application May 6, 1944, Serial No. 534,504

6 Claims. (Cl. 29—41)

This invention relates to automatic lathes and screw machines, and more particularly to such machines of the single spindle type where machining operations are performed on a single work bar.

One object of this invention is to provide for a considerable number of machining operations to be performed simultaneously, overlapping, or sequentially, or any combinations of these, without the necessity of stopping to index the work from one to a succeeding tooling station. This means that each tooling operation may be completed without interruption.

As shown herein there are four side forming tool positions, and there are five axial tool positions for turning, drilling, boring, reaming, tapping, or the like.

A further object is to provide controlling mechanism for the axial positioned tools permitting great flexibility of control.

Still another object is to provide an indexing turret for carrying the axial position tools, together with improved indexing and axial motion control mechanism.

Still another object is to provide for control of the axial tooling position tools for operation as desired, either independently of or in definite relation to side forming operations as may be found desirable in any given set up.

A further object of the invention is to provide novel actuating mechanism for the axial position tools including an actuating lever in which the position of the fulcrum as well as of the actuating arm is varied and controlled.

Another object of the invention is to employ a lever for actuating the axial tools wherein the relatively slow cutting motion of these tools is produced by motion of the lever actuating arm, while the relatively fast idle motions are produced by motion of the lever fulcrum.

Another object of the invention is to provide for retraction of the axial tools when desired for an inspection and measurement of the work.

A further object is to provide for varying the speed of rotation of the work spindle in accordance with the requirements of the tools operating at any one time and to provide for reverse direction drive of the work spindle when necessary.

Another object of the invention is to provide control for the speed varying means which automatically locks against actuation all but the parts to be actuated when a change of speed or direction of rotation is desired.

Further objects and advantages will appear from a more complete description of an embodiment of the invention shown in the accompanying drawings, in which Figure 1 is a fragmentary front elevation of a machine embodying the invention.

Figure 2 is a top plan view of the same with the top cover removed and with certain parts shown in section.

Figure 3 is a left hand end elevation of the machine with a lower portion broken away.

Figure 4 is a view partly in front elevation and partly in longitudinal section on line 4—4 of Figure 2.

Figure 5 is a sectional view to a larger scale on line 5—5 of Figure 4.

Figure 6 is a sectional view on line 6—6 of Figure 5.

Figure 7 is a sectional view to a larger scale on line 7—7 of Figure 4.

Figure 8 is a sectional view on line 8—8 of Figure 7.

Figure 8a is a detail sectional view on line 8a—8a of Figure 7, but showing the shaft 400 rocked out of neutral position.

Figure 9 is a sectional view to a larger scale on line 9—9 of Figure 4.

Figure 10 is a sectional view on lines 10—10 of Figures 3 and 9 and to the scale of Figure 9.

Figure 11 is a sectional view to a larger scale on line 11—11 of Figure 4.

Figure 12 is a fragmentary front elevation to a larger scale than Figure 1 and showing the stock stop in operative position.

Figure 13 is a sectional view to a larger scale on line 13—13 of Figure 4.

Figures 14 and 15 are fragmentary sectional views on lines 14—14 and 15—15, respectively, of Figure 13, Figure 15 being to a larger scale.

Figure 16 is a right hand end elevation of the upper portion of the machine with the end cover removed.

Figure 17 is a view similar to a portion of Figure 16, but showing the parts in different positions.

Figure 18 is a fragmentary exploded perspective view of the tool-holding turret, a bearing therefor, and a tool slide.

Figures 19, 20 and 21 are somewhat diagrammatic views similar to a portion of Figure 4, but showing the parts in successive positions during a cycle of operations of an axial tool.

The machine shown in the drawings comprises a bed 1 from opposite ends of which arise hollow columns 2 and 3 connected at their upper ends by a longitudinal frame 4. The upright column 2 has journaled therein and arranged longitudinally of the machine, a work spindle 5.

Axial tool turret

Beneath the work spindle and parallel thereto is journaled a shaft 6 which extends into the column 3. Within the column 3 and concentric to the shaft 6 there is journaled in the end frame members 10 and 11 of this column, a turret 12 having end flanges 13 and 14 connected at angular intervals by webs 15. To the end flange 13 there is secured, as by screws 16, an extension 17, which, except at its extreme left hand portion, is formed pentagonal in cross section, each of the sides as shown in Figure 18 being provided with a way 18 extending longitudinally thereof and having retaining strips 19 holding therein, slidably mounted, a tool holder 20. The end flange 13 of the main turret is recessed opposite to these ways so that the holders 20 may extend therethrough. The outer end portion of each holder 20 is narrowed as at 21 and has secured thereto an extension block 22 provided with an upturned end flange 23 defining, with the end of the extension 21, a slot 24. Each block 22 is slidable along a pad 25 on the outer face of the central portion of the turret 12. This turret 12 is also provided with a pair of spaced circular flanges 27 and 28, each of which is provided with registering notches 29 and 30, respectively, through which the block 22 and the portion 21 of the tool holder may slide, the space between these flanges 29 and 30 being substantially the same as the width of the slot 24.

Between the flanges 29 and 30 on opposite sides of the central vertical plane of the machine there are positioned a pair of journal standards 32 having opposed arcuate flanges 33 shaped to engage between the turret flanges 27 and 28. The upper ends of these arcuate flanges 33 are spaced apart as at 34 by an amount substantially equal to the widths of the slots 29 and 30 and also the widths of the block 22 and the portion 21 of each tool holder, so that the tool holder in the uppermost position at any one time is free to be moved axially between the upper ends of the arcuate flanges 33, while in all other angular positions of the turret, these flanges 33 extend through the slots 24 of the holders and prevent them from being moved axially. Each of the holders 20, as shown in Figure 11, is provided with suitable means, such as a T slot 40, for securement thereto of suitable tools. For example, in Figures 1 and 4, a holder 41 for a drill 42 is shown as secured to the uppermost holder slide 20. Such tools are arranged in such relation to the axis of work carried by the work spindle 5 as to perform the desired operation thereon, but for convenience herein they are termed the end working tools, since their motion is lengthwise of the work, due to the sliding motion of their respective holder slides 20.

The shaft 6 is journaled within the turret 12 so that the turret and its extension 17 and the shaft 6 mutually support each other during a considerable portion of the length of the shaft 6. The turret 12 which carries the longitudinally movable tool holders is arranged to be indexed to bring the tool holders on the several holder slides successively into operative relation to the work.

Side working tools

During the complete cycle of operations on the work other tools, carried by four tool holding slides 50, 51, 52 and 53 are arranged to approach the work from different directions but without capability of axial motion relative thereto. Thus the tool holder at 50 may have the rough forming tool; the tool holder at 51 facing tools; the tool holder 52, the finish forming tool, and the tool holder 53, the cutting off tool. The tool holders 50 and 53 are supported between the end columns 2 and 3 from the top frame member 4 for downward and inward, and upward and outward sliding motion, while the tool holders 51 and 52 are arranged to be moved in from back and front of the machine, respectively.

Work spindle and control

The upper frame member 4 supports a main cam shaft 60 which is journaled parallel to the spindle 5 and to the lower shaft 6, and this cam shaft 60 supports a series of cam drums which in general control the cycle of operations of the machine. The work spindle may be of well known type having means such as a collet chuck for gripping the work and feed mechanism for feeding the work periodically and after the completion and the cutting off of work from the forward end of the stock, these being of the general type well known in the art. It is sufficient for present purposes to point out that the opening and closing of the collet is produced by axial motion of a spool 61 surrounding the spindle and actuated by suitable cams (not shown) on a cam drum 62 carried by the cam shaft 60, while the feed of the stock, while the collet is open, is accomplished by springs 64 which press inwardly on a feeding slide 65 which engages a flanged head 66 of the feed mechanism, the position of the slide 65 being controlled by an edge cam 67 also carried by the shaft 60. As these mechanisms may be of well known form, no further description thereof is believed necessary. The outer end of the spindle is supported on a stationary yoke 68 which supports the weight of stock when the stock is too short to be supported by the usual stock reel (not shown).

Side tool actuating mechanism

The four side tool slides are actuated by cams on certain of the cam drums carried by the shaft 60. As shown, for example, in Figure 11, the slide 50 is actuated by the longitudinal motion of a bar 70. This bar is provided with a cam follower roll 71 (see Figure 2) actuated by cams on a cam drum 73. The tool slide 53 is actuated by the longitudinal motion of a bar 74 provided with a cam follower roll 75 actuated by cams on the drum 76. The tool slide 51 is actuated by the rocking of a vertical shaft 77, the lower end of which is connected through a suitable rock arm with the slide 51 as shown in dotted lines in Figure 2. The upper end of the shaft 77 has fixed thereto an arm 78 to which is connected a link 79 which is connected to an axially movable bar 80 at its rear end provided with a cam follower 81 for actuation by cams on the cam drum 82. The tool slide 52 is similarly actuated by the rocking of a vertical shaft 89, the lower end of which is connected by a link 83 to the slide 52 and the upper end of which has secured thereto an arm 84 connected through a link 85 with a slide bar 86 provided with a cam follower 87 for actuation by cams on a cam drum 88. The bars 70 and 74 are operatively connected to their respective slides as by the inclined cam and follower shown in dotted lines in Figure 12 for the bar 74 and to the slide 53.

Stock stop

A cam drum 90 on the cam shaft 60 is provided with cams which actuate a stock stop which is brought down in front of the work spindle whenever stock is to be fed forward to measure off a length of stock for the next series of machining operations after a completed length has been cut off. As shown best in Figures 2, 4, and 12, the stock stop is carried by a rock shaft 95 which is journaled and slidably mounted in a fixed bearing 96 secured to the lower face of the frame member 4 and at its opposite end is rockably mounted in a slide 97 carrying a cam follower 98 controlled by cams on the cam drum 90. The stock stop 99 is carried at one end of an arm 100 which is adjustable lengthwise of the shaft 95 by adjustment of a pair of spaced collars 101 and 102 threaded on this shaft at opposite sides of the arm 100. The rear end of the shaft 95 has secured thereto a spiral gear 105 which meshes with a fixed angular rack 107 secured to the under face of the frame member 4, the arrangement being such that as the slide 97 is moved axially toward the stock projecting from the forward end of the spindle, the shaft 95 is rocked to bring the stock stop from an inoperative elevated position down into alinement with the stock into the position shown in Figure 12, so that the stock may be fed out into contact therewith and then clamped, whereupon the stock stop is immediately returned to its upper position with a component of motion axially away from the stock, so that it immediately frees itself therefrom.

Axial tool indexing and actuating mechanism

The main control cam shaft 60 carries within the end column 3, a cam drum 120 carrying on its face a plurality of edge cams as 121, and opposite to the working edges of these cams, the drum 120 is provided with an outstanding rim 122. Positioned between the rim 122 and the active faces of these cams rides a cam follower 123 projecting inwardly from the actuating arm of a lever 124. This lever 124 is fulcrumed as at 125 on a slide 126 mounted in guides 127 and 128 to move in a path substantially parallel to the main control cam shaft 60. The lower end of the lever 124 carries a follower 130 which is adapted to engage in the slot 24 of that particular tool carrier 20 which happens to be uppermost in any indexed position of the turret 12 so that on rocking of the lever 124 from the position shown in Figure 20 to that of Figure 21, the tool holder 20 may be moved toward the work to present the tool or tools thereon adjacent to cutting relation to the work. Further motion of the tool holder is produced by engagement of the particular edge cam 121 which happens to be active at that particular time on the follower 123 as shown in Figure 4. The motion of the tool produced by motion of its fulcrum is a relatively fast idle motion, while the slow working motion is produced by the action of a cam 121 while the lever fulcrum is stationary in the position of Figures 4 and 15. It will be understood that there is a cam 121 for each of the tool holders 20, the main control shaft 60 rotating once for each complete cycle of the machine, during which cycle each of the tool holders 20 is brought into operative position. In the positions of the parts shown in Figures 4, 15, 19 and 21, the slot 24 is out of alinement with the space between the flanges 29 and 30 of the turret, this being possible because the arcuate flanges 33 do not prevent such motion of the uppermost tool holder 20. When the tool has completed its work, the corresponding tool holder 20 is retracted quickly to the position shown in Figure 20 with its slot 24 in alinement with the space between the flanges 27 and 28, this being accomplished by motion of the fulcrum slide 126. For this purpose the slide 126 is provided with a cam follower 135 (Figures 13 and 15) which rides in a cam groove 136 in a cam 137 secured to a secondary shaft 138.

During the time that the lever 124 is being moved relatively slowly by the edge cams to cause an axial tool to operate on the work, the cam follower 135 is at the forward limit of its cam groove 136 in the position shown in Figures 4 and 15, and at this position there bears against the cam follower 135 a hardened removable wear plate 140 set into the cam 137 in position to take the thrust exerted by the follower 135 thereagainst. The shaft 138 which carries the cam 137 is rotated by power and its rotation is initiated under control of the main control cam shaft 60. The power for rotating the shaft 138 is derived from a motor 145, the shaft 146 of which (see Figure 14) carries a sprocket wheel 147 over which passes a chain 148. This chain 148 passes beneath a spring pressed idler 149 and over a sprocket wheel 150 journaled on a cross shaft 151. The chain 148 also passes downwardly about a sprocket wheel 152 carried by a shaft 153 near the base of the machine. This shaft 153 is connected to drive a coolant pump and a lubricating pump, neither of which is shown in the drawings, but which may be located outside the main casing and beneath the motor 145.

The sprocket wheel 150 may be connected to rotate the shaft 151 by means of a clutch 155 (Figures 13 and 14) which may be operated by a bell crank lever yoke 156, the short arm 157 of which is pivoted to the lower end of a link 158, the upper end of which is pivoted at 159 on a rock arm 160. The link 158 has a pair of spaced follower rolls 162 and 163 between which is positioned a pentagonal cam 164 carried by a shaft 165, the arrangement being such that as this cam 164 is rotated from the position shown in Figure 13, it lifts the link 158 as a high point of the cam rides beneath the follower 162 and throws in the clutch 155, thus to drive the shaft 151, while when the high point of the cam 164 rides out from the follower 162 and another high point rides above the follower 163, the link 158 is lowered and the clutch 155 is thrown out. The shaft 151 carries a worm 1510 meshing with a worm wheel 1511 connected as through a shear pin 1512 with the cam 137 (see Figure 15) so that whenever the clutch 156 is closed, the cam 137 is rotated, this rotation being through a complete revolution, returning the cam follower 135 to its initial extreme left hand position shown in Figure 15 before the rotation of the shaft 138 stops.

The shaft 165 which carries the clutch controlling cam 164 is arranged to be rotated step by step, the step which is effective to close the clutch 155 being produced by actuation of the main control shaft 60, while the step which opens the clutch 155 is accomplished by the rotation of the secondary shaft 138. For the purpose of effecting closing of the clutch 155, the main control shaft 60 has adjustably secured to its outer end, five disks 170 each provided with an outstanding arm 171, there being one of these arms 171 corresponding to each of the five faces of the turret. As shown, each of the disks 170 is arranged to be clamped to the shaft 60, being split with the split ends connected by adjustable screws, and in order to facilitate the placing of the arms 171 in the desired angular relationship to each other, a graduated disk 172 may be secured to the end of the cam shaft 60. All but one of the arms 171 are shown as provided with outwardly extending posts 174. These may be provided in order to prevent too close angular positioning of the arms 171 and each may also be provided with an index mark 175, which together with the indexing disk 172, will facilitate the adjustment of these arms angularly to the desired positions. These arms 171 are offset relatively into adjacent planes and are arranged in the same planes with fingers 173 outstanding from a hub member 180 secured to the shaft 165. The arrangement is such that as the main control shaft 60 is rotated, these arms 171 may impinge upon the corresponding finger 173 as indicated in Figure 16, turning the shaft 165 at each such impingement through an arc of 36°, this being sufficient to lift the link 159 from the position shown in Figure 13 to its upper position with a high point of the cam 164 beneath the follower 162, which throws in the clutch 155. The outer end of the shaft 138 carries a segmental shaped member 185 having an arcuate cam rim portion 186 for a portion of its circumference and carrying on its inner face an indexing follower 187. It also carries on its outer face a follower 188 which is positioned to impinge successively upon lobes 189 projecting outwardly from a star wheel 190 also carried by the shaft 165, as shown in Figure 16, this acting to turn the shaft 165 through a succeeding 36°, bringing the high point of the cam 164 against the cam follower 163 and depressing the link 158 and throwing out the clutch 155. The clutch 155 may be closed by the operator when desired, by pulling outwardly against the tension of a spring 192 on a handle 191 which carries a pivotally mounted latch member 193 which impinges on the star wheel 190 and rotates the cam 164 to clutch-closed position.

Rotation of the follower 187, which as before noted, has been termed an "indexing element" acts upon a Geneva wheel 195 secured to the outer end of the turret 12 as by means of screws 196, while the arcuate cam element 186 operates a turret locking mechanism to unlock it before indexing is to occur and allowing it to lock it after the completion of the indexing. This locking mechanism, as shown in Figure 16, comprises a bell crank lever 200 pivoted on the fixed shaft 201, one arm of this lever carrying a cam follower roll 202 against which the outer face of the cam 186 is adapted to impinge during one portion of the rotation of the member 185, lowering the follower 202 from the position shown in Figure 16 to the position shown in Figure 17 and rocking a locking dog 205 out from a locking recess of a block 206, five of which are set into the periphery of the Geneva wheel 195 at equal angular intervals. The forward edge 210 of the cam portion 186 effects this release of the lock just before the actuator 187 enters the adjacent indexing slot 212 of the Geneva wheel.

The parts are so timed that the cam 137 has returned the tool holder 20 to its initial position shown in Figure 20 with its slot 24 in alinement with the arcuate rib 34 before indexing occurs. The first portion of the rotation of the cam 137 acts to retract the follower 123 from engagement with one of the edge cams 121 and brings it against the cam drum rim 122 which acts as a limit stop for the follower 123, as shown in Figure 19, while continued rotation of the cam 137 to the position shown in Figure 20 acts to fully retract the holder slide 20 so that it is in position for the turret indexing to take place. When this indexing has been completed, the cam 137, returning the fulcrum 125 toward its inner position, first brings the follower 123 against the next succeeding edge cam element 121, whereupon the fulcrum reaches its inward position of Figure 15 at fast speed and the cam 137 ceases to rotate. The position of the tool holder slide 20 is then under full control of the edge cam 121 until the cam 137 is again started, which retracts the cam follower 123 against the rim 122 and thereafter moves the tool slide to the rear position of Figure 20 where indexing can take place.

The forward motion of each tool slide may be limited positively and independently for each by the adjustment of check nuts 220 on threaded stop rods 221 secured to and projecting rearwardly from each of the tool slide blocks 23. These check nuts, impinging upon the outer face of the Geneva wheel, limit the forward motion of each of the tool slides. If desired, also, similar check nuts 222 which may impinge upon the inner face of the turret flange 14 may limit the retracting motion to bring the slots 24 into alinement with the arcuate ribs 33. The turret locking mechanism is normally held in locking position as by a leaf spring 225 bearing against the locking arm 205 and it may be held in unlocked position when desired by adjustment of a bolt 226 extending through an arm 227 secured to the bell crank lever 200 which may be caused to bear against an anchor member 228 which secures the fixed end of the spring 225.

It may also be desired, as for setting up the machine, or to retract the end tools for inspection and measuring the work, to rotate the cam 137 manually. To this end, the outer end of the shaft 151 may be made polygonal as at 230 and with it may be engaged a hub 231 of a hand wheel 232, this hub having a hole shaped to receive the end 230. In the position shown in Figure 13, this hand wheel is reversed from its actuating position and is supported on a hook 233 secured to the cover plate 234, which normally prevents access to the fulcrum bar 126. In the position shown, it protects the operator from accidental contact with the shaft end. It is desirable that the extent of this turning motion of the cam 137 be limited. To this end, the shaft 151 is provided with a worm 235 journaled thereon and connectible by a clutch 2350 to the shaft 151. This worm 235 meshes with a worm wheel 236 journaled on a fixed shaft 237. A stop 238 carried by this worm wheel 236 and which may impinge upon one or the other side of the worm 235 limits the angular extent of adjustment. A stop switch located at 240 normally engaging in a notch in a disk 241 fixed to the worm wheel 236 is immediately opened on rotation of the disk 241 to bring its notch out of registry with the switch, this opening the circuit to the motor 145, and to the motor 300 to be later described, which rotates the work spindle and the controlling cam shaft 60. These motors cannot be started until the cam 137 has been returned to starting position. The clutch 2350 is controlled by a pivoted yoke 242 which is linked to the bell crank yoke 156 of the clutch 155 as by a rod 245, so that when the clutch 155 is open, which is the condition when the shaft 139 is stationary, the clutch 2350 is closed in condition for the manual turning of the shaft 151 to be effective on the limit switch 240 and the stop 238.

Spindle drive mechanism

The drive of the work spindle and cam shaft 60 is derived from a motor 300 (see Figure 3) mounted upon a platform 301 (see Figures 5, 6 and 10) pivoted at one side as on the pintles 302 and supported at its free end on a casing 303 at one side of the end column 2 by an adjustable threaded support 305 engaging a post 306 depending from the platform 301. This motor has its driving pulley 310 connected by a multiple V belt 311 with a main pulley 312 carried by a shaft 313 journaled in opposite side walls of the casing 303. The casing 303 with its gear train is separable as a unit from the main portion of the machine frame. The shaft 313 has journaled thereon a beveled gear 314 having a brake drum portion 315. The bevel gear 314 may be coupled to the shaft 313 by a clutch 316 which may be actuated through a clutch arm 317 fixed to an actuating bar 318 slidable axially through opposite sides of the casing 303. It may be moved axially by the rocking of a two-part shaft 319 having a double arm 320 connected by a link 321 to a block 322 secured to the bar 318. One portion of the shaft 319 projects through the casing 303 and is provided outwardly thereof with an actuating handle 325. This clutch may also be actuated automatically. For this purpose the other portion of the shaft 319 carries an arm 326 provided with a cam follower 327 actuated by suitable cams on a drum 3270 carried by the main control shaft 60. The forward end of this other portion 319 also carries an actuating handle 3250. When the clutch is released, a band brake 328 bearing on the drum portion 315 quickly stops the rotation of the bevel gear 314. This bevel gear meshes with a bevel gear 330 on a cross shaft 331 provided with a worm 332 meshing with a worm wheel 333 on the shaft 60 and connected thereto through the usual safety device such as a shear pin. This provides the high speed drive for the main control shaft 60.

The shaft 313 also drives the work spindle at any selected of three forward and one reverse speed. For this purpose it carries a gear 340 meshing with a gear 341 keyed to the shaft 342 and which meshes, in turn, with a gear 343 journaled on a shaft 344. The shaft 344 is connected through a pair of change gears 345 and 346 within the separable housing 347, with a shaft 348. The shaft 348 carries a sprocket wheel 349 connected thereto through a shear pin 3490 (Figure 10) and over which passes a sprocket chain 350 which passes beneath an idler 351 and about a sprocket wheel 352 on the work spindle 5 (Figure 9). The most commonly used forward speed is that derived through the closing of the clutch 355 by which the gear 343 is connected to drive the shaft 344, the train then being from the shaft 313 through the gears 340, 341, 343, shaft 344, gears 345 and 346, shaft 348 and through the chain drive to the spindle.

If a higher spindle speed is desired, as for small drilling or cutting off the work piece from the bar, the transmission may be taken from the gear 340 to the gear 341, shaft 342, closed clutch 360, gear 361, gear 362 secured to the shaft 344 and through change gears 345 and 346. If a lower speed is desired, the transmission is from the gear 340, through gear 341, shaft 342, closed clutch 365 which connects the gear 366 journaled on the shaft 342 to the shaft 342, the gear 367 secured to the shaft 344, and through the change gears 345 and 346.

Where a tapping operation is employed, it is necessary to reverse the direction of rotation of the spindle in order to retract the tap from the work. The drive in the reverse direction is accomplished by closing the clutch at 370, the train then being from the gear 340 to the gear 341, shaft 342, the chain 371 passing over a pulley 372 (Figure 7) fixed to the shaft 342 and over a second pulley 373, clutched to the shaft 344 by the clutch 370, which thus drives the shaft 344 in the reverse direction. The clutches 365, 355, 360 and 370 are actuated by yokes carried by pivoted arms 380, 381, 382 and 383.

A low speed drive for the main control cam shaft 60 is derived from the spindle. To this end the spindle is provided with a sprocket wheel 385 which is connected through a sprocket chain 386 with sprocket wheels 388 and 389 on a pair of shafts 390 and 391 (see Figures 7 and 9). As shown best in Figures 5 and 8, the shaft 390 carries a gear 392 meshing with a gear 393 on a shaft 394, while the shaft 391 carries a gear 395 meshing with a gear 396 fixed to the shaft 390. The sprockets 388 and 389 are connected with the shafts 390 and 391 by roll clutches which permit the drive to these shafts only in opposite directions. Thus when the chain 386 is traveling in a direction to rotate the shaft 390, it is ineffective on the shaft 391, the transmission then being from the shaft 390 through the gears 392, 393 to the shaft 394. When the chain 386 is moving in the opposite direction, the shaft 391 is being driven in the reverse direction to the drive of the shaft 390 while the shaft 390 is not then being driven, and the transmission is then through the gears 395, 396, 392 and 393 to the shaft 394. The shaft 394 is thus driven in the same direction, regardless of the direction of motion of the chain 386. The shaft 394 has a worm 398 thereon which drives a worm wheel 400 journaled on the shaft 331 and adapted to be connected thereto through a one way roller clutch 401 and a positive clutch 402. The roller clutch provides for overrunning of the shaft 331 when it is connected for the high speed drive from the gear 330 even though the positive clutch 402 be closed, and the positive clutch 402 provides for drive from the worm wheel 400 when the bevel gear 330 is not being driven. This low speed positive clutch is controlled by the swinging arm 403 carried by a rock shaft 404 and which may be controlled from the exterior of the machine by a handle 405 at the front of the machine. The rock shaft 404 may also be connected through an arm 406 and a link 407 with an arm 408 on a rock shaft 409 provided with an actuating handle 410 at the back of the machine.

The control of the speed and the direction of rotation of the spindle may be effected automatically in accordance with the requirements of the cycle of the machine. As shown these are controlled by cams on two cam drums 420 and 421 carried by the shaft 6. Cams on the drum 420 control the angular position of a rock shaft 422 having a cam follower 423 actuated by these cams, the shaft 422 also having a handle 424 outside of the machine casing by which it can be actuated. The opposite end of the rock shaft 422 has fixed thereto a double rock arm 425 (see Figure 6) having a pair of angularly related ways 427 and 428. Within the way 427 rides a follower 429 on an arm 430 connected to the clutch arm 383, both of these being fulcrumed at 432. The way 428 has riding therein a follower 435 carried by an arm 436 connected to the clutch arm 380, both being fulcrumed at 437. Rocking of the member 425 in a counterclockwise direction as viewed in Figure 6, swings the arm 436 and actuates the slow speed clutch arm 380, while it is substantially ineffective to rock the arm 430 in view of the angularity of the way 427 with relation to that of the arm 430. Rocking of the member 425 in clockwise direction from the position shown exerts a substantial rocking action on the arm 430 to actuate the clutch arm 383 while it is substantially ineffective to rock the arm 436 due to the angular relation of this arm to the way 428. The cams on the drum 421 act similarly to rock a rock shaft 440 which also is provided with a follower 441 and with an actuating handle 442 outside of the machine. The inner end of the shaft 440 is provided with a double arm member 4420 having a pair of pins 443 and 444, which ride in slots 445 and 446, respectively, in arms 447 and 448 connected to the clutch arms 382 and 381, respectively. Rocking of the member 442 counterclockwise from the position shown is substantially ineffective to rock the arm 447, but is effective to rock the arm 448, while rocking of the member 442 clockwise rocks the arm 447, thus moving the clutch arm 382 while it is substantially ineffective to rock the arm 448. Thus by rocking either of the shafts 420 and 440 in one or the other direction, the control clutches determining the speed and the direction of rotation of the spindle are actuated. The shafts are also interlocked so that when any one of these four clutches is actuated, all of the others are held against actuation by the interlocking connections between the two rock shafts 422 and 440 with their actuating mechanisms. The interlocking of the shafts 420 and 440 is produced by mechanism best shown in Figures 5, 7, and 8. Each of the shafts 422 and 440 has fixed thereto an edge cam such as 450 and 451, each of these cams being circular for the greater portion of its periphery, but provided with a flat at 452 and 453. Riding on the two shafts 422 and 440 is a member 454 slotted at its ends as at 455 to engage over and be supported by the shafts 422 and 440. Between these shafts the member 454 is provided with oppositely facing cam engaging faces 456 and 457, each facing one of the cams 450 and 451. These faces 456 and 457 are so spaced with relation to the shafts 422 and 440 and the cams thereon that when one of these member faces is engaged by a corner adjacent to the circular portion of one of the cams 450 and 451, as shown in Figure 8a, which is the situation whenever the corresponding shaft is turned out of neutral position by its actuating cams, the member 454 is pushed over toward the opposite shaft, bringing its face against the flat of the other cam, thus preventing this shaft from being rocked out of its neutral position while the other shaft remains out of neutral angular position. Thus only one of the clutches which controls the speed or direction of rotation of the work spindle may be closed at any one time.

Machine operation

At the start of a machine cycle, work 690 which is carried within the hollow spindle 5 projects forwardly therefrom to the desired extent for the machining operations as shown in Figures 1 and 4, this extent having been determined by the setting of the stock stop which just before the close of the cycle was moved into operative position for the feeding of the work and then removed to its inoperative position shown in Figures 1 and 4. The lever 124 is then in the position with its cam follower 123 engaging an edge cam 121 adjacent to the beginning of its contact therewith and its fulcrum 135 is in engagement with the block 140 of the cam 137 as is shown in Figure 15. The upper tool carrier slide 20 has thus been moved forwardly toward the work from its retracted position where the turret might be indexed, and the indexing mechanism is in the position shown in Figure 16 with the turret locked. The main cam drum 60 and the work spindle are then started to rotate, the motor 145 being in continuous rotation during the entire time of operation of the machine, and the various tooling operations are started upon the work, these depending upon the setting of the cams on the several cam drums which control the motions of the side tool slides and the end working tools. The end working tool is given its forward tooling motion toward the work by rocking of the lever 124 by motion of its actuating follower 123 in accordance with the contour of its controlling cam 121, and this action continues during the rotation of the shaft 60 until the edge cam 121 passes the desired amount past the lever follower 123. When this has occurred, the clutch cam 164 is rotated by engagement of one of the fingers 171 on a finger 170 of the shaft 165, closing the clutch 155 and starting the rotation of the secondary shaft 138 and the cam 137 thereon. The action of the cam path 136 of this cam 137 immediately retracts the fulcrum slide 126 toward the right as viewed in Figure 4, and swings the follower 123 against the rim 122 of the cam drum 120 into the position shown in Figure 19. As soon as this cam follower bears against the rim 122, further rotation of the cam 137 acts quickly to pull the tool slide 20 back to the position of Figure 20 where its notch 24 is in alinement with the space between the flanges 27 and 28. At about this time the cam portion 186 on the segment 185 engages the follower 202 of the turret locking arm 200 and releases this arm, whereupon the indexing member 197 engages in one of the slots of the Geneva wheel and indexes the turret. Further rotation of the cam 137, the lower end of the lever 124 now engaging in the next tool slide because of the indexing of the turret, acts to return the upper cam follower 123 back against the succeeding cam 121 and then moves the tool slide now engaged toward the work until the fulcrum slide follower 135 reaches the forward position of Figure 15, whereupon the cam 121 is able to take charge and produce the feed motion of the tool against the work. By the time the cam 137 has completed its single revolution, the follower 188 on the segment 185 has struck one of the points 169 of the star wheel and disconnected the clutch 155 and thus stopped the rotation of the secondary shaft 138. The tooling operation then continues with the second axial tool. This operation is repeated as often as one of the fingers 171 starts the rotation of the secondary shaft, retracting one of the tools and causing indexing of the turret and bringing a subsequent axial tool into position. It will be noted that whenever one cam 121 is moving out of action and a succeeding cam 121 is moving into action, the follower 123 is in engagement with the cam rim 122. Thus smooth continuity from one cam 121 to the next is not necessary, and they may present a jagged or saw tooth effect if this is desirable, to properly position successively presented axial tools.

At any time during the operation of the end tools, the side working tools may be operated in accordance with their desired sequences, and at suitable times in the complete cycle, the speed of rotation of the spindle is changed as may be desired by the nature of the tools working thereon. Whenever the direction of rotation of the spindle is reversed, of course the side working tools will be out of operation.

During the retraction of the axial working tools, it may be desired to speed the rotation of the cam shaft 60 and this is done by the actuation of the clutches which control the drive of this shaft either from the high speed drive or from the low speed drive, as previously described.

Near the end of the cycle of operations when all of the end working and side working tools have completed their cycles of operation, the last side working tool cuts off the completed stock while the axial working tools are in retracted positions, the work is unclamped in the spindle and the stock is fed forward against the stock stop which has been moved into operative position. The stock stop is then retracted, and the machine is in the condition for the beginning of the next complete cycle of operations.

From the foregoing description of certain embodiments of this invention, it should be evident to those skilled in the art that various other modifications and changes might be made without departing from the spirit or scope of this invention.

I claim:

1. In combination, a work holder, an indexing turret, a plurality of tool holders carried by said turret in position for tools on said tool holders to be moved sequentially into and out of operative relation to work on said work holder by indexing of said turret, a main control shaft, a cam drum on said main control shaft having edge cams thereon and an outstanding rim spaced from the active faces of said cams, a secondary shaft, power driving means for said shafts, a lever having an actuating arm, a follower on said arm movable along said drum between said edge cams and said rim, a member on which said lever is fulcrumed movable transverse to the fulcrum axis and substantially parallel to said main control shaft, a cam on said secondary shaft moving and controlling the position of said fulcrum member, means for rotating said main control shaft to cause said edge cams to move said lever and impart working motion to the tool holder in operative position while said secondary shaft is stationary, means controlled by said main control shaft at the end of said working motion to rotate said secondary shaft thereby to move said fulcrum to bring said follower against said rim and to return said tool holder to a starting position, and means actuated by continued rotation of said secondary shaft thereafter to index said turret to bring a succeeding tool holder into operative relation to said lever and then to return said fulcrum member to its active position with said follower in controlled relation to one of said edge cams and to then stop the rotation of said secondary shaft.

2. A machine of the class described, having an indexing tool carrier provided with a plurality of ways extending parallel to its indexing axis, a tool holder reciprocable in each of said ways, a tool holder actuator, said actuator and holders having portions interengaging when the portion of each holder is moved to a predetermined angular position about the indexing axis by the indexing of said carrier and is in a predetermined axial position, a stationary member with which each of said tool holders engages while out of said predetermined angular position for retaining said tool holders in said axial position means for moving said actuator to move a tool holder in said angular position away from said axial position while said carrier is in an indexed position and for returning said tool holder to said axial position before a subsequent indexing of said carrier, and means for indexing said carrier.

3. A machine of the class described, comprising an indexing carrier provided with a plurality of ways extending parallel to its indexing axis, a holder reciprocable in each of said ways, and having a slot in its face turned outwardly from said axis, said carrier having a peripheral slot with which said holder slots may register, a stationary member engaging in said slots and provided with an opening at one angular position with which said holders register serially as said turret is brought into indexed positions, said opening permitting the holder registering therewith at any time to be moved in its ways to bring its slot out of registry with said peripheral slot, means actuable to move each holder when in such registering position to bring its slot out of registry with said peripheral slot and thereafter to return said holder to said registering position, and means for indexing said turret.

4. In combination, members comprising a work holder and a tool holder mounted for relative motion to cause a tool on said tool holder to act on and retract from work on said work holder, a support mounted for reciprocatory motion, a lever fulcrumed on said support and having one arm connected to one of said members and another arm provided with a cam follower, a main cam shaft, a secondary cam shaft, a cam drum carried by said main cam shaft, an edge cam carried by said drum, said drum having a rim spaced from said edge cam and within which space said cam follower rides, a closed cam on said secondary cam shaft, a follower for said closed cam connected to said support, means for intermittently rotating said secondary cam shaft to move said support and bring said lever cam follower into and out of engagement with said edge cam and rim and said movable holder toward and from operative relation to the other of said holders, and means for rotating said main cam shaft.

5. In combination, a work holder, an indexing turret, a plurality of tool holders carried by said turret in position for tools on said tool holders to be moved sequentially into and out of operative relation to work on said work holder by indexing of said turret, a main control shaft, a cam drum on said main control shaft having edge cams thereon, a limit stop spaced from the active faces of said cams, a secondary shaft, power driving means for said shafts, a lever having an actuating arm, a follower on said arm movable along said drum between said edge cams and said stop, a member on which said lever is fulcrumed movable transverse to the fulcrum axis and substantially parallel to said main control shaft, a cam on said secondary shaft moving and controlling the position of said fulcrum member, means for rotating said main control shaft to cause said edge cams to move said lever and impart working motion to the tool holder in operative position while said secondary shaft is stationary, means controlled by said main control shaft at the end of said working motion to rotate said secondary shaft thereby to move said fulcrum to bring said follower against said stop and to return said tool holder to a starting position, and means actuated by continued rotation of said secondary shaft thereafter to index said turret to bring a succeeding tool holder into operative relation to said lever and then to return said fulcrum member to its active position with said follower in controlled relation to one of said edge cams and to then stop the rotation of said secondary shaft.

6. In combination, members comprising a work holder and a tool holder mounted for relative motion to cause a tool on said tool holder to act on and retract from work on said work holder, a support mounted for reciprocatory motion, a lever fulcrumed on said support and having one arm connected to one of said members and another arm provided with a cam follower, a main cam shaft, a secondary cam shaft, a cam drum carried by said main cam shaft, an edge cam carried by said drum, a stop spaced from said edge cam and within which space said cam follower rides, a closed cam on said secondary cam shaft, a follower for said closed cam connected to said support, means for intermittently rotating said secondary cam shaft to move said support and bring said lever cam follower into and out of engagement with said edge cam and stop and said movable holder toward and from operative relation to the other of said holders, and means for rotating said main cam shaft.

CARROLL E. MILLER.

REFERENCES CITED

The following references are of record in the file of this patent:

UNITED STATES PATENTS

| Number | Name | Date |
|---|---|---|
| 725,438 | Gridley | Apr. 14, 1903 |
| 857,893 | Newton | June 25, 1907 |
| 1,199,252 | Eichler | Sept. 26, 1916 |
| 1,215,000 | Cone | Feb. 6, 1917 |
| 1,484,604 | Chapman | Feb. 19, 1924 |
| 1,514,485 | Ward | Nov. 4, 1924 |
| 1,567,790 | Drissner | Dec. 29, 1925 |
| 1,765,592 | Klausmeyer et al. | June 24, 1930 |
| 1,788,422 | Drissner et al. | Jan. 13, 1931 |
| 1,865,527 | Lovely | July 5, 1932 |
| 2,007,564 | Dixon | July 9, 1935 |
| 2,118,014 | Montgomery | May 27, 1938 |
| 2,169,780 | Wilson | Aug. 15, 1939 |
| 2,170,633 | Drissner | Aug. 22, 1939 |
| 2,286,457 | Boillat | June 16, 1942 |
| 2,339,140 | Boillat | Jan. 11, 1944 |
| 2,348,052 | Boillat | May 2, 1944 |

FOREIGN PATENTS

| Number | Country | Date |
|---|---|---|
| 11,526 | Great Britain | May 9, 1914 |